Oct. 21, 1947.  H. O. McMAHON  2,429,474
APPARATUS FOR DETERMINING THE VAPOR CONTENT OF A GAS
Filed April 25, 1945  3 Sheets-Sheet 1

Inventor
HOWARD O. McMAHON
By Frank N. Houghton
Agent

Oct. 21, 1947.    H. O. McMAHON    2,429,474
APPARATUS FOR DETERMINING THE VAPOR CONTENT OF A GAS
Filed April 25, 1945    3 Sheets—Sheet 2

Inventor
HOWARD O. McMAHON
By Frank M. Houghton
Agent

Oct. 21, 1947. H. O. McMAHON 2,429,474
APPARATUS FOR DETERMINING THE VAPOR CONTENT OF A GAS
Filed April 25, 1945 3 Sheets-Sheet 3

Inventor
HOWARD O. McMAHON
By Frank N. Houghton
Agent

Patented Oct. 21, 1947

2,429,474

UNITED STATES PATENT OFFICE 2,429,474

APPARATUS FOR DETERMINING THE VAPOR CONTENT OF A GAS

Howard O. McMahon, Lexington, Mass., assignor to Arthur D. Little, Inc., Cambridge, Mass., a corporation of Massachusetts Application April 25, 1945, Serial No. 590,211

9 Claims. (Cl. 73—29)

1

This invention relates to apparatus for determining the vapor content of a gas.

In particular, it is useful in determining the water-vapor content of oxygen, and will be described in detail in that connection. However, it may be used equally well, for example, in determining the water-vapor content of air, nitrogen, carbon dioxide, or other gases, or in determining the hydrocarbon-vapor content of gases, for example in determining the content of solvent vapors in the air of an enclosed space where such solvents are used. Broadly defined, this invention is useful in determining generally the vapor content of a gas, that is, the content of a first fluid in a second fluid when said first fluid has a higher boiling point than said second fluid and both are associated in gaseous form as supplied to the testing apparatus under the conditions of testing herein described.

A simple, economical, easily operated apparatus for determining quickly the vapor content of gases has long been desired, and considerable effort has been spent in attempting to develop such apparatus. So far as I am aware, however, all such apparatus at present available suffers from one or more of the difficulties of complexity in design or operation, length of time or large amount of sample required for analysis, lack of sufficient accuracy, or high cost and intricacy of manufacture. The device of the present invention avoids all these difficulties, as will be evident from the description which follows:

One use of the present invention is for testing the contents of cylinders of breathing oxygen for use by aviators, to determine whether or not the water vapor content is low enough so that it will not freeze out as ice crystals and plug the breathing apparatus when operated and used at high altitudes and low temperatures, e. g., below about −40° C. Another use is in testing the air in factories or other closed spaces where solvent vapors may be present, in order to provide a warning of the approach or presence of too high a concentration of such vapors in the atmosphere.

The device herein described is a dew point (or frost point) apparatus, wherein the vapor in the gas under examination is condensed on the surface of a target which is refrigerated by means of a jet of expanding carbon dioxide or other refrigerant fluid selected for characteristics appropriate to the particular gases and vapors to be examined. Such other fluid may for example be ammonia, dichloro-difluoro-methane, or sulfur dioxide.

2

The present device is compact, light in weight, and easily operated by inexperienced personnel. It may be operated as a "pass or reject" device, as in determining whether the water vapor content of each of several cylinders of oxygen is above or below a predetermined amount. Alternatively, it may be used to measure the actual vapor content. It is very sensitive, being readily capable of measuring as low a water vapor content as 0.02 mg. per liter of gas, or even less, and, when operated as a "pass or reject" device, of distinguishing between vapor contents of 0.018 and 0.021 mg. per liter of a gas. This device is an absolute one in the sense that no calibration is necessary and no charts are needed in performing an analysis. The vapor content is read from a gauge dial and the result is independent of variations in ambient temperature, and of other external variables.

The time required for each separate test is small, being ordinarily about a minute in addition to the time required to couple and uncouple the sources of gas being tested.

The quantity of refrigerant required per test is small, in the order of 5 grams more or less, for ordinary purposes. The flow of gas being tested is also small, say at the rate of about 2 liters per minute, or more or less according to whether the apparatus is larger or smaller than that herein described.

The present device may also be made to operate automatically and continuously, as will be described in greater detail hereinafter.

These and other features of the device of this invention will be described in greater detail below with reference to the accompanying drawings, wherein Fig. 1 is a side elevational view, partly in section, showing one form of testing apparatus, embodying this invention;

Figure 1:
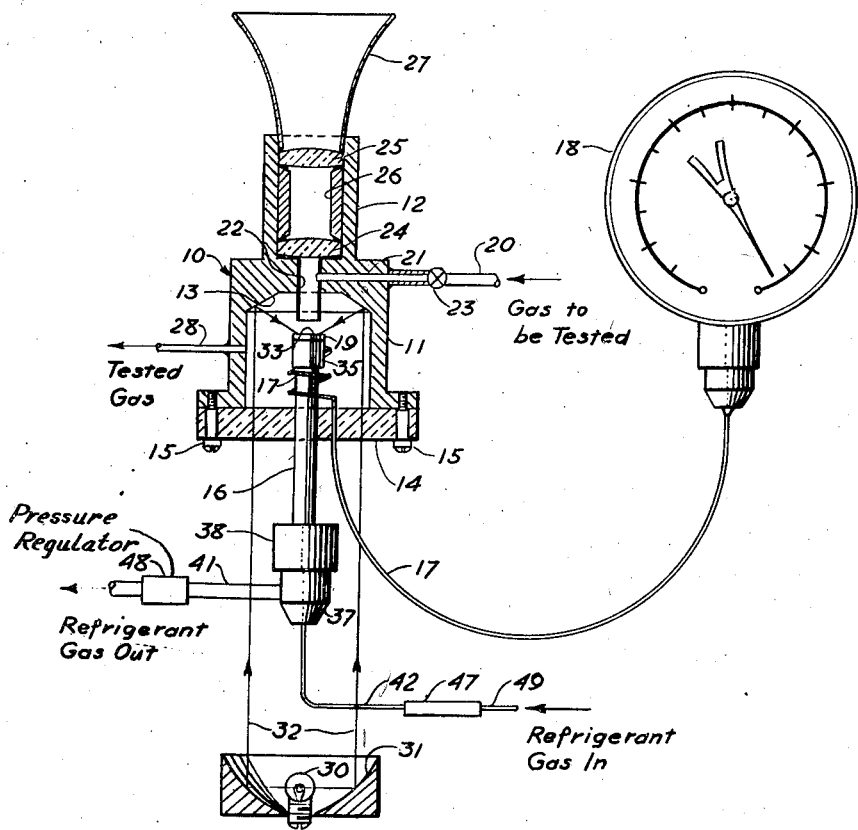

Now with reference to Fig. 1, the numeral 10 represents the main body of the instrument, which consists of two principal parts, the test chamber 11 and the lens chamber 12. These chambers are conveniently of circular or annular cross section, for ease in manufacture, and reflecting surface 13 must have such cross section.

Test chamber 11 has an opening at its lower end, which opening is covered by a window of transparent material 14 such as methyl methacrylate polymer attached in any convenient way, as by bolts 15, 15, so as to be substantially gas-tight. In the center of window 14 is a hole in which is located the expansion tube assembly, the outer tube 16 of which fits in gas-tight relationship with window 14. Another hole in window 14 is provided to receive, also in gas-tight relationship, the tubing 17 which connects the thermometer 18 with the interior of target 19.

Line 20, connecting with the source of gas to be tested, leads to port 21 which communicates with cylindrical gas admission chamber 22. If the source of gas is under pressure, as is the case in testing cylinders of breathing oxygen, for example, the entrance of such gas into the device is controlled by valve 23, which may conveniently be a simple needle valve. A port 28 is provided in the wall of test chamber 11 as an exit orifice for tested gas.

In lens chamber 12 are positioned two magnifying lenses, 24 and 25 separated by lens sleeve 26. The lower lens 24 is fitted sufficiently tightly in lens chamber 12 to prevent passage of gas by it to or from test chamber 11. Any suitable eyepiece 27 is positioned in the top of the lens chamber 12 above upper lens 25. This lens system may conveniently give a magnification of 10 to 15 diameters, and is arranged to focus on target face 33.

Positioned below the instrument body 11 is a light source 30 with parabolic reflector surface 31 so arranged as to project rays of light, of which rays 32 are representative, onto the smooth, light-reflecting, conical surface 13, from which they are reflected onto top face 33 of target 19. Light source 30 and reflector surface 31 may be at any other convenient location as long as rays 32 fall upon surface 13 in a direction substantially parallel to the axis of said surface; thus, the light source and reflector may be at one side, and the rays 32 may be projected via one or more reflecting flat mirrors onto surface 13.

The axis of the path of the rays of light 32; and the axes of target face 33, chamber 22, lenses 24 and 25, and conical surface 13 are all coincidental or substantially so. This is necessary in order to permit proper observance of the target face 33 and of any vapor condensed thereon during operation of the apparatus. In fact, for convenience in manufacture it is desirable to have the entire body of the instrument, other than ports 21 and 28 and tubing 17, symmetrical about its vertical axis.

Conical surface 13 and target face 33 are so arranged that light rays 32, on striking surface 13, are specularly reflected onto the target face at a relatively small angle such that they will not be further specularly reflected from the target face into chamber 22. Consequently the target face 33, which, like surface 13, is polished to a mirror finish, appears dark when viewed through the lenses 24, 25. When dew or frost is deposited upon the target face, however, it is immediately and sharply visible, as it scatters the rays of light striking the target face and reflects and/or refracts some of them upwardly through chamber 22 and the lenses, which serve to magnify the appearance of the target face and any dew or frost which may deposit thereon. Chamber 22 is of sufficiently small diameter with respect to the diameter of target 19, and is also near enough to target face 33, that no light from source 30 can pass directly, via window 14, into it. Furthermore, the interior surfaces of test chamber 11, other than conical reflecting surface 13, are advantageously made dark and non-reflecting, to minimize the possibility of any undesired light entering chamber 22.

Figures 2, 3:
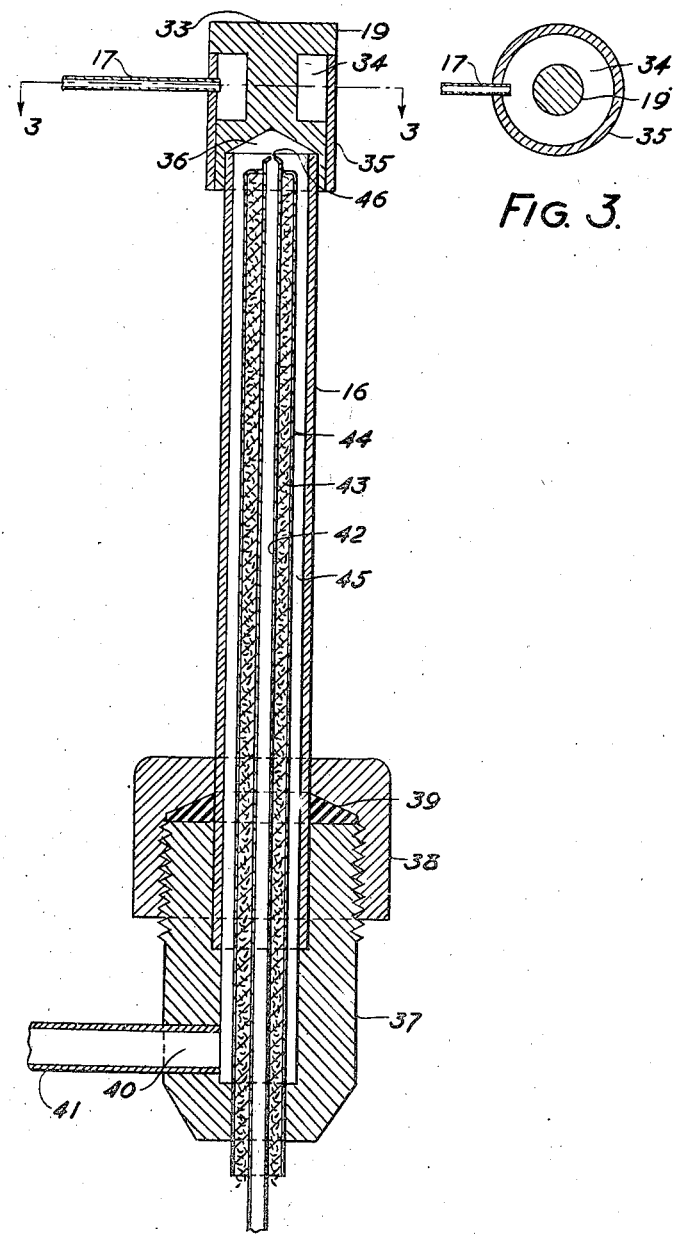
Fig. 2 is an enlarged sectional side elevational view of the target and expansion tube assembly which are shown, but not in section, in Fig. 1.
Fig. 3 is a cross-sectional view of the target taken along line 3—3 of Fig. 2.

The target and the expansion tube assembly, which are shown in side elevation in Fig. 1, are shown in greater detail and in section in Figs. 2 and 3, to which reference is now made in conjunction with the showing in Fig. 1.

Target 19, which is made of a block of copper or other highly heat-conductive metal, is provided with an annular cavity 34 and a sleeve 35 having a gas-tight fit over cavity 34. Tubing 17 communicates with cavity 34 through sleeve 35. Another cavity 36, preferably of circular cross-section, is bored in the bottom of the target to receive outer tube 16 of the expansion tube assembly, which tube is tightly fixed in cavity 36 and serves to hold the target assembly in position within test chamber 11.

To minimize heat conduction to the target, tube 16 and tubing 17 are made of a relatively non-conducting metal, such as Monel metal.

At the opposite end of the tube 16 from target 19 is a header assembly consisting of a body member 37 and a screw cap 38 therefor. Washer 39, of polymerized chloroprene synthetic rubber, is disposed between so that when cap 38 is screwed down tightly on body member 37 a tight fit against tube 16 is obtained. Tube 16 terminates short of the bottom of body member 37, so that a passage is provided from the interior of tube 16 through body member 37 and out through port 40 into line 41 which leads to the atmosphere through a pressure regulator 48.

Refrigerant gas is led into the expansion tube assembly through tube 42. This tube is preferably provided with a filter 47, beyond which is tube 49 connecting with the source of refrigerant. Filter 47 may consist of a piece of tubing filled with tightly packed glass wool. Tube 42 passes up centrally of tube 16, and terminates close to the bottom of target 19 in an expansion orifice 46. This orifice may be made, for example, to pass about 2½ liters per minute of carbon dioxide from cylinders under the usual pressure. Tube 42 must ordinarily be thermally insulated from the cold expanded refrigerant gas passing from orifice 46 downwardly through space 45, at least when carbon dioxide is the refrigerant gas, since carbon dioxide ordinarily contains a considerable amount of moisture, and consequently, without such insulation, the exchange of heat between tube 42 and the expanded carbon dioxide in space 45 causes ice crystals to form and block the orifice 46. Accordingly, tube 42 is surrounded by a blanket 43 of fine glass wool or equivalent insulation, held in place by sheath 44 which may, for example, be a thin walled copper tube. This sheath 44 fits substantially gas-tight in a hole provided in body number 37.

When the apparatus is assembled, annular cavity 34 and tubing 17 connecting with thermometer 18 are filled with a suitable fluid having a sufficiently high coefficient of expansion to operate the thermometer satisfactorily as a result of temperature changes of the target 19. Such a fluid is one which, when maintained at substantially constant volume, changes in pressure sufficiently with changes of temperature (or one which, when maintained at substantially constant pressure, changes in volume sufficiently) "sufficiently" meaning enough to operate the thermometer over a suitable range to permit effective testing of the particular gas under the conditions imposed for any given test.

The fluid may be a substance which remains a liquid throughout the testing, e. g., toluene or mercury, which have high coefficients of expansion. Or it may remain gaseous, in which case nearly any fixed gas such as nitrogen or hydrogen may be used, and under considerable pressure in order to be most effective. Ordinarily the best type of fluid, for most accurate measurement, is one such as carbon dioxide, dichlorodifluoro methane, methyl chloride, or sulfur dioxide, which not only has a relatively large coefficient of expansion but which also undergoes change of phase when cooled below a certain point by cooling of the target 19. The combination of relatively large coefficient of expansion with change of phase permits a great sensitivity in the testing device of this invention.

The thermometer 18 may accordingly be a liquid-filled thermometer, a gas-filled thermometer, or a limited-liquid-filled thermometer, respectively. It is, therefore, broadly speaking a "fluid-filled thermometer" (or a "fluid thermometer"). The third mentioned (i. e., limited-liquid-filled) type, which may also be referred to as a vapor thermometer, is preferred, as indicated above, and carbon dioxide under pressure is a convenient fluid for use therewith. For convenience, therefore, the following description will ordinarily refer to thermometer 18 as a vapor thermometer, and the fluid which actuates it as carbon dioxide, it being understood that other types of thermometers and fluids may be used as indicated above.

When using carbon dioxide as the fluid for filling annular cavity 34 and tubing 17, it should be under suitable pressure, e. g., about 160 p. s. i. Carbon dioxide is introduced accordingly and this assembly is then sealed off.

Care is desirable in selection of a suitable ratio of "bulb" volume to "warm" volume. If the bulb volume (that within annular cavity 34) is too small in this ratio, it may fill completely with liquid before sufficient carbon dioxide has condensed to bring the pressure down to its equilibrium value at that temperature. On the other hand, if the bulb volume is relatively too large, an appreciable decrease will occur in the carbon dioxide pressure before vapor-liquid equilibrium is reached. This causes a decrease in sensitivity of the device because the full scale of the pressure gage is not utilized in the vapor-liquid range. The warm volume is that within vapor thermometer 18 and tubing 17.

The shape and size of annular cavity 34 should be such as to minimize any temperature difference between the walls of the cavity and the target face 33. Accordingly, the target 19 is fabricated from a solid block and cavity 34 is made as small as possible consistent with the bulb volume-warm volume ratio already mentioned. A generous cross-sectional area of target 19 is maintained over its entire height to obviate local thermal gradients. Provision of a poorly conducting tubing 17, e. g., of Monel metal, permits a true indication of target temperature, since a vapor pressure thermometer will always indicate the lowest temperature in the system.

Target face 33 is polished and then plated with nickel or bright chrome, for example, in order to produce a flat mirror as nearly perfect as possible.

Vapor thermometer 18 is preferably calibrated to read directly the vapor content of the gas being tested, for example in grams of vapor per liter of gas. Actually, of course, this thermometer measures the temperature of target 19, and may also be calibrated for such purpose if desired.

Control of the temperature at the target face 33 is accomplished by allowing the compressed refrigerating gas to expand through orifice 46 against the bottom of target 19. The cold expanding refrigerant gas, generally partially liquefied or solidified, cools the target rapidly to within a few degrees of the temperature of the expanding gas. This rapid cooling is promoted by having the target of readily conducting metal, as already stated. By controlling the pressure of the expanding refrigerant gas, the temperature of the target may be fixed and maintained at any desired value. For example, when carbon dioxide is the refrigerant gas, and it is expanded from normal cylinder pressure (about 1000 p. s. i.) to atmospheric pressure, the equilibrium temperature is $-109.4°$ F. and the refrigerant consists of a mixture of carbon dioxide snow and cold gas. If, however, the expansion goes only to 5 atmospheres, the temperature is $-69.9°$ F. and the stream of refrigerant may be a mixture of solid, liquid and gaseous carbon dioxide. This is the triple point for carbon dioxide, and corresponds very closely to the frost point of breathing oxygen containing 0.02 mg. of water vapor per liter at atmospheric pressure. If the expansion goes to higher than 5 atmospheres, the stream of refrigerant is a mixture of liquid and gaseous carbon dioxide, or even entirely gaseous carbon dioxide at higher back pressures, and the temperature of the target may be raised as high as desired.

These back pressures are maintained by any suitable pressure regulator 48, of which several are known commercially, which can maintain steadily any back pressure to which it is set. A needle valve is not suitable as it tends to permit the back pressure to drift. This pressure regulator, as already stated, is inserted at any convenient place in line 41.

Some slight modification of the apparatus shown in Fig. 1 may be desirable in testing gases which have a very low vapor content. Thus, in the analysis of breathing oxygen having less than about 0.02 mg. of moisture per liter at atmospheric pressure, the accuracy of the instrument tends to decrease. This is because the triple point of carbon dioxide is just below the temperature of frost formation for such moisture content. Below the triple point, the carbon dioxide, as it expands at orifice 46, consists of a mixture of snow and gas, which has a lower heat transfer coefficient than a carbon dioxide liquid-gas mixture and a more erratic behavior in general. This difficulty may be obviated, in the testing of gases with very low vapor content, by putting the test chamber 11 under pressure (using a back pressure valve in line 28, in the position of 109 in Fig. 4) and applying the appropriate pressure factor correction to the moisture content indication on thermometer 18. For example, if the pressure of the gas being tested is raised to twice atmospheric, there will be twice as much vapor present as in the same volume of the same gas at atmospheric pressure, and thermometer 18 will accordingly read twice the true value. The relatively heavy construction of the body 10 shown in Fig. 1 will withstand a considerable internal pressure; for atmospheric pressures this body may be made much thinner.

In this connection, if the walls of body 10 are made quite thin, it may not be practical to bore port 21 as shown, and may accordingly be preferable that port 21 consist instead of a tube leading from the outside to chamber 22.

Figure 4:
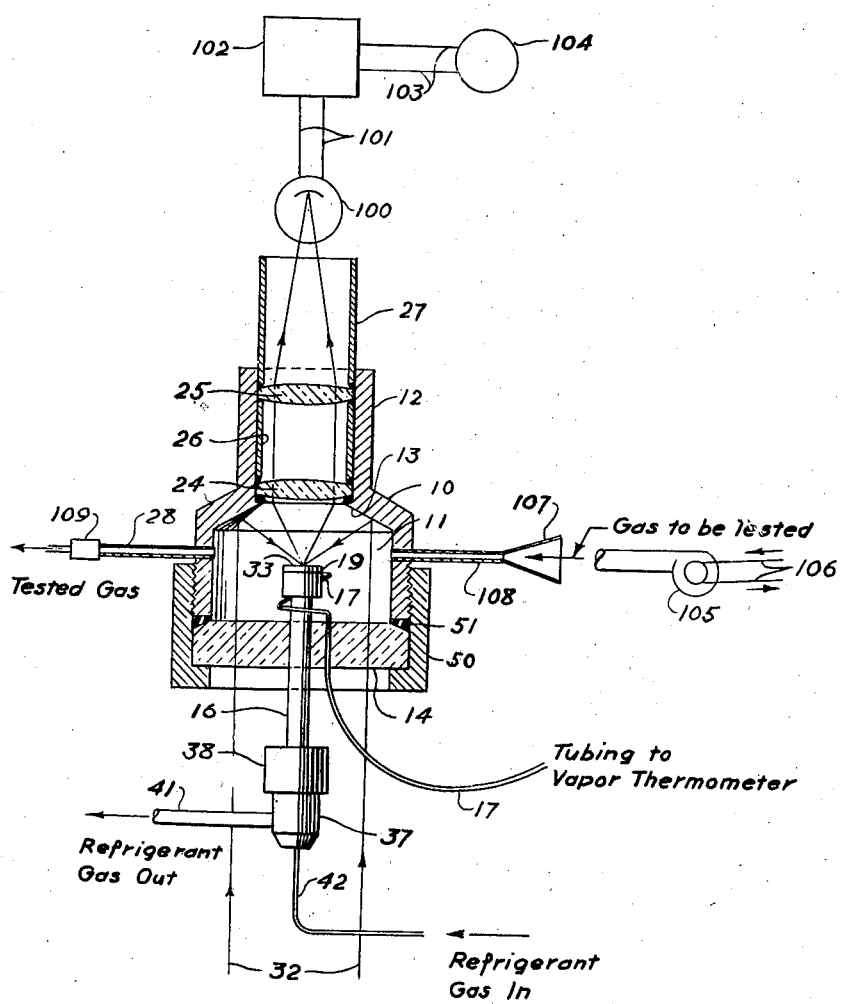
Fig. 4 is a side elevational view, partly in section, showing alternative modifications of the present device.

Other alternative constructions are shown in more detail in Fig. 4. These and the modifications already referred to may be used singly or in a number of combinations in the apparatus of this invention, as will be clear from the description of them. Most of the parts shown in Fig. 4 are the same as those in Fig. 1, and for such like parts the same numerals are given. Thus, the device of Fig. 4 consists of main body 10, having test chamber 11 and lens chamber 12. Test chamber 11 is provided with a base 50 which screws onto the main body 10 and holds methyl methacrylate polymer window 14 snugly against washer 51 of polymerized chloroprene synthetic rubber. Target 19 and the expansion tube assembly and tubing 17 are as in Fig. 1, and are similarly located in window 14. The vapor thermometer connecting with tubing 17, and the source of light, are as shown in Fig. 1. Lens chamber 12 is similarly provided with lenses 24 and 25, lens sleeve 26, and eye piece 27. Conical surface 13 and target face 33 are polished, as in Fig. 1, and the rest of the interior of test chamber 11 (except for the window 14) is preferably dark and non-reflecting. The header assembly consisting of body member 37 and screw cap 38 with lead-in tube 42 and outlet line 41 for refrigerant are also as shown in Fig. 1. So also are the light source 30 and parabolic mirror 31 whereby substantially parallel light rays, of which rays 32 are repreesntative, are projected onto reflecting conical surface 13 and thence to the polished top face 33 of target 19.

Observation of the deposit of dew or frost on target face 33 may be made visually, as described in connection with Fig. 1. Alternatively, it may be made automatically, by any suitable device of which one is shown schematically above the eye piece 27 in Fig. 4. The observing device here illustrated consists of a phototube or equivalent light-sensitive device 100, connected by lead wires 101 to amplifier 102 of standard design. This amplifier is connected by lead wires 103 to an output circuit 104 of any suitable form, which may for example be a device for recording successive presence and absence of dew or frost on the target face, or for merely registering such presence, as by a moving hand on a dial, or by a warning light or siren.

Continuous operation of the device, as for testing the air in any given space for the presence of vapors of a volatile solvent, can be effected for example by using the arrangement shown in Fig. 4, wherein a blower 105 actuated through belt 106 by a source of power (not shown) drives a blast of the air to be tested into funnel 107 and thence through inlet line 108 into the space within the test chamber 11.

It may also be desirable, especially when the apparatus of this invention is used by inexperienced operators, to provide a whistle or other simple indicator of rate of flow on the outlet line 28 from the test chamber 11. Such an indicator positioned at 109 in Fig. 4, is a useful guide in establishing a suitable rate of flow of sample through the apparatus. It can be set to act at the proper flow rate by qualified personnel prior to carrying out regular tests, and may subsequently be adjusted as desired for changes in conditions, e. g., in kind of gas to be tested, or in kind or amount of vapors to be tested for.

Alternative arrangements for introducing the gas to be tested into test chamber 11 include the replacement of blower 105 by a pump in line 108 or by an aspirator in outlet line 28. Any suitable impelling device for the gas can thus be used.

Another distinction between the device of Fig. 1 and that of Fig. 4 is in the location of the inlet port (21 in Fig. 1; 108 in Fig. 4). While either of the two arrangements may be used in either device, that shown in Fig. 1, though perhaps somewhat more difficult to construct, has some advantages in operation because of the fact that a smaller amount of sample of the gas to be tested is required. This is because the gas entering through port 21 has merely to sweep out all gas previously present in port 21, gas admission chamber 22, and the space between and immediately adjacent to the latter and target face 33, in order to permit effective testing of such entering gas. In Fig. 4, on the other hand, the gas entering through port 108, instead of being channeled directly towards and against the target face, diffuses more or less throughout the interior of test chamber 11, and hence a materially larger sample of gas must be introduced through port 108 than through port 21 in order to insure effective purging of gas previously present in the test chamber, and consequent accurate determinations of vapor in the sample of gas being introduced.

Procedure for operation of the device of this invention will now be discussed in more detail, with reference to the determination of water vapor content of aviators' oxygen as an example. Two types of operation, already referred to, will be described: (I) "pass or reject" testing; (II) determination of absolute water vapor content.

I. "Pass or reject" testing. Some arbitrary degree of dryness is chosen as a critical value, e. g., 0.02 mg. of water vapor per liter of gas at atmospheric pressure. The regulator valve 48 is adjusted so that the temperature of the target always falls to the same required value when the high-pressure carbon dioxide is flowing through tube 42 and orifice 46. The carbon dioxide cylinder is connected to tube 49, after first blowing a blast of carbon dioxide through the outlet fittings on the cylinder to remove any dirt.

The oxygen cylinder is then connected to gas inlet line 20, using only clean dry fittings and metal tubing. Needle valve 23 is then opened and the test chamber 11 is sufficiently purged, whereupon the flow is adjusted to a suitable rate for the particular apparatus, e. g., about two liters per minute for devices of the type and size shown in Figs. 1 and 4.

The carbon dioxide cylinder valve is then opened (at least one full turn for the usual carbon dioxide cylinder under the conditions of this example), and after the vapor thermometer 18 has reached a steady value, the pressure regulator 48 is adjusted until thermometer 18 indicates the desired value of 0.02 mg. per liter, and this pressure regulator 48 need not be further manipulated during the series of tests. About 15 to 20 seconds is ordinarily required to reach this value, from the time of turning on the stream of carbon dioxide.

The light 30 is now turned on and the target face 33 is examined through the lenses for the presence of frost specks. These show up sharply against the dark background. If frost appears, the sample of oxygen being tested contains more moisture than that of the critical value, i. e., more than 0.02 mg. of water vapor per liter. If no frost appears after a wait of about 15 to 20 seconds, the content of water vapor is below the critical value and the sample "passes" the test.

The light and the carbon dioxide supply are then shut off, the target is permitted to warm up for a few seconds, and the valve 23 is then closed and the oxygen cylinder disconnected. The test may then be repeated on another cylinder.

In conducting a series of these tests, the following precautions should be observed: (1) the target 19 should always be warm (as indicated by thermometer 18) before changing oxygen test cylinders, for if uncoupling is done when the target is too cold, the instrument may breathe moist air and hence require a long purging period before the next test; (2) the carbon dioxide cylinder should always be so held that no liquid drains therefrom during testing, as expansion orifice 46 is designed to pass only gaseous carbon dioxide and would pass entirely too much if liquid carbon dioxide were introduced; (3) the rate of flow of the oxygen under test should be properly controlled, as too high a rate causes high heat transfer coefficient between the oxygen and the target with consequent warming of the target even though the expansion pressure of the carbon dioxide is unchanged; while too low a rate may permit diffusion of stagnant gas (from previous testing) from recesses in and around the sample chamber. In the former instance (too high a rate) there is no error in the result of the test but the regulator 48 must be adjusted to compensate for such excessive flow rate. In the other instance (too low a rate), error would be likely as the moisture content of the stagnant gas would affect the result.

II. Determination of absolute vapor content. Although the procedure is much the same as in "pass or reject" testing, a few more or less obvious modifications are required. The time required, though somewhat longer, is still no more than a minute or two outside of that needed for making connections.

With initial connections made as already described under I, and with valve 23 opened and the sample flowing into test chamber 11, regulator valve 48 is closed sufficiently to give a back pressure of about 150 p. s. i. and carbon dioxide from the cylinder thereof is introduced as before. Within a few seconds the target is cooled to an equilibrium value corresponding to the frost point of about 0.10 mg. per liter. Light 30 is turned on, and the target is then observed continuously while the regulator valve 48 is slowly opened so as gradually to lower the target temperature. Frost will eventually appear on target face 33 (unless the sample is almost perfectly vapor-free), and when it does, the moisture content may be read directly on thermometer 18. Care should be taken not to lower the temperature of the target too rapidly, in order to avoid over-shooting the frost point. Sometimes it may be necessary or desirable to warm the target and repeat the experiment; the first result may be used as a rough guide and little time is required in locating the frost point quite accurately on the second trial.

While this invention has been described in connection with typical examples of the practice thereof, it is to be understood that this has been done for illustrative purposes only and that the practice of this invention may be varied within the scope thereof as defined by the language of the following claims.

I claim:
1. In a device for determining the vapor content of a gas, a chamber, a target therein provided with a coolable light-reflecting surface, means for introducing gas to be tested into said chamber and over said coolable surface, means for viewing said coolable surface from a position outside of said chamber, means for directing rays of light onto said coolable surface at an angle such that said light when reflected from said surface is directed elsewhere than into said viewing means, means adjacent said target for expanding a refrigerant gas directly against said target and means for imposing a controlled back pressure on said expanding refrigerant gas, to cool said target to a desired temperature sufficiently low to cause initiation of condensation upon said coolable surface of moisture in said gas being tested, said condensed moisture being visible through said viewing means by virtue of rays of said light scattered from said condensed moisture, said refrigerant gas being in out-of-contact relationship with the gas being tested, and means for measuring the temperature of said coolable surface, said last-named means comprising means providing a closed space within said target and immediately adjacent and in heat-conductive relationship with said coolable surface and said means for expanding the refrigerant gas, an indicator, and a hollow tube connecting said closed space and said indicator; said tube and closed space being filled under pressure with a normally gaseous fluid which is at least partially liquefiable when said coolable surface is at operating temperature, and which actuates said indicator.

2. A device according to claim 1 wherein said viewing means comprises magnifying lenses.

3. A device according to claim 1 wherein said viewing means comprises a light-sensitive device and an indicating means actuated thereby.

4. In a device for determining the vapor content of a gas, a testing chamber, a target therein provided with a reflecting face, means for viewing said target face from outside of said chamber and in a direction substantially perpendicular to said face, a transparent area in a wall of said chamber for admitting light, means within said chamber for reflecting such light onto said target face and from said face away from said viewing means, means for introducing gas to be tested into said testing chamber and over said target face, means for expanding a compressed refrigerant gas against said target to cool the same to a desired temperature sufficiently low to cause initiation of condensation upon said target face of moisture in said gas being tested, said condensed moisture being visible through said viewing means by virtue of rays of said light scattered from said condensed moisture, means for maintaining said refrigerant gas out-of-contact with the gas within said testing chamber, means providing a closed space within said target, an indicator connected therewith, and a fluid within said closed space adapted to actuate said indicator by changes in temperature of said target.

5. In a device for determining the vapor content of a gas, a testing chamber, a target therein provided with a reflecting face, means for viewing said face from outside of said chamber and in a direction perpendicular to said face, a passage between said face and said viewing means, the axis of said passage being substantially in line with the axis of said face, means for introducing the gas to be tested into said passage, said passage being arranged to direct said gas onto said face prior to circulation elsewhere within said chamber, a transparent area in a wall of said chamber for admitting light, means within said chamber for reflecting such light onto said target face and from said face in directions other than into said passage, means for expanding a compressed refrigerant gas against said target and against a controlled back pressure to cool said target to a desired temperature sufficiently low to cause initiation of condensation upon said reflecting surface of moisture in said gas being tested, said condensed moisture being visible through said viewing means by virtue of rays of said light scattered from said condensed moisture, means for maintaining said refrigerant gas out-of-contact with gas within said testing chamber, means providing a closed space within said target filled with a liquefiable normally gaseous fluid under pressure, and an indicator connected with said closed space and actuated by changes in volume of said normally gaseous fluid.

6. In a device for determining the vapor content of a gas, a testing chamber, a light source outside of said chamber, a transparent area in a wall of said chamber positioned to admit light from said light source into said chamber, a passage in a wall of said chamber opposite said transparent area, a target composed of a block of metal of high heat conductivity and being positioned within said chamber to block direct rays of light from passing from said light source into said passage, a reflecting surface on said target substantially perpendicular to the axis of said passage, means for viewing said reflecting surface through said passage from a position outside of said testing chamber, means within said chamber for reflecting said light from said light source onto said target face at an angle too small to permit reflection of said light into said passage, means for introducing gas to be tested into said passage and thence over said target face and into said testing chamber, means for expanding a compressed refrigerant gas against said target and against a controlled back pressure to cool said target to a desired temperature sufficiently low to cause initiation of condensation upon said reflecting surface of moisture in said gas being tested, said condensed moisture being visible through said viewing means by virtue of rays of said light scattered from said condensed moisture, means for maintaining said refrigerant gas out of contact with gas within said testing chamber, means providing a closed space within said target filled with a normally gaseous fluid under pressure and an indicator connected with said closed space and actuated by changes in volume of said normally gaseous fluid.

7. In a device for determining the vapor content of a gas, a chamber, a target therein provided with a coolable light-reflecting surface, means for introducing gas to be tested into said chamber and over said coolable surface, means for viewing said coolable surface from a position outside of said chamber, means for directing rays of light into said coolable surface at an angle such that said light when reflected from said surface is directed elsewhere than into said viewing means, an expansion orifice adjacent said target and adapted to expand refrigerant gas directly against said target, a first conduit for leading compressed refrigerant gas to said orifice, a second conduit adjacent said first conduit for leading expanded refrigerant gas away from said orfice after expansion therein, thermal insulation means separating said first conduit from said second conduit and adapted to substantially prevent heat exchange between said first and second conduits, means for imposing a controlled back pressure on said expanding refrigerant gas, said refrigerant gas being in out-of-contact relationship with the gas being tested and being effective to cool said target to a desired temperature sufficiently low to cause initiation of condensation upon said coolable surface of moisture in said gas being tested, said condensed moisture being visible through said viewing means by virtue of rays of said light scattered from said condensed moisture, and means for measuring the temperature of said target.

8. In a device for determining the vapor content of a gas, a testing chamber, a target therein provided with a reflecting face, means for viewing said target face from outside of said chamber and in a direction substantially perpendicular to said face, a transparent area in a wall of said chamber for admitting light, means within said chamber for reflecting such light onto said target face and from said face away from said viewing means, means for introducing gas to be tested into said testing chamber and over said target face, an expansion orifice adjacent said target and adapted to expand refrigerant gas directly against said target, a first conduit for leading compressed refrigerant gas to said orifice, a second conduit adjacent said first conduit for leading expanded refrigerant gas away from said orifice after expansion therein, thermal insulation means separating said first conduit from said second conduit and adapted to substantially prevent heat exchange between said first and second conduits, means for maintaining said refrigerant gas out-of-contact with the gas within said testing chamber, said refrigerant gas being effective to cool said target to a desired temperature sufficiently low to cause initiation of condensation upon said reflecting face of moisture in said gas being tested, said condensed moisture being visible through said viewing means by virtue of rays of said light scattered from said condensed moisture, means providing a closed space within said target, an indicator connected therewith, and a fluid within said closed space adapted to actuate said indicator by changes in temperature of said target.

9. In a device for determining the vapor content of a gas, a chamber, a target therein composed of a block of metal of high heat conductivity and provided with a reflecting face, means for introducing gas to be tested into said chamber and over said reflecting face, means for viewing said reflecting face from a position outside of said chamber, means for directing rays of light onto said reflecting face and from said face away from said viewing means, means for expanding a refrigerant gas directly against another face of said target opposite said reflecting face, means for maintaining said refrigerant gas out-of-contact with the gas being tested, said refrigerant gas being effective to cool said target to a desired temperature sufficiently low to cause initiation of condensation upon said reflecting face of moisture in said gas being tested, said condensed moisture being visible through said viewing means by virtue of rays of said light scattered from said condensed moisture, means providing a closed space in the block of metal composing said target, said space-providing means being positioned between said reflecting face and said other face, said two faces and said space-providing means being spaced apart from each other but in direct thermal contact with each other through the medium of said block of metal constituting said target, an indicator, a hollow tube connecting said closed space and said indicator, and a normally gaseous fluid which is at least partially liquefiable when said target is at operating temperature filling said closed space and said tube for actuating said indicator.

HOWARD O. McMAHON.

REFERENCES CITED

The following references are of record in the file of this patent:

UNITED STATES PATENTS

| Number | Name | Date |
|---|---|---|
| 1,883,116 | Tomlinson | Oct. 18, 1932 |
| 2,025,617 | Schramm | Dec. 24, 1935 |
| 2,376,209 | Turin | May 15, 1945 |
| 1,789,098 | DeGraaf | Jan. 31, 1931 |
| 1,950,180 | Jones et al. | Mar. 6, 1934 |
| 2,240,082 | Thornthwaite | Apr. 29, 1941 |
| 2,281,418 | Deaton et al. | Apr. 28, 1942 |
| 1,343,454 | Jeannet | June 15, 1920 |

FOREIGN PATENTS

| Number | Country | Date |
|---|---|---|
| 220,772 | Great Britain | June 19, 1930 |